INVENTOR
Henry Greber

United States Patent Office

3,364,371
Patented Jan. 16, 1968

3,364,371
LIGHTNING ARRESTER WITH VAPORIZABLE LIQUID ELECTRODE
Henry Greber, 225 W. 80th St., Apt. 8-D,
New York, N.Y. 10024
Filed Dec. 14, 1964, Ser. No. 417,951
1 Claim. (Cl. 313—34)

The purpose of this invention is to provide a simple and inexpensive lightning arrester with a great current interrupting capacity, beyond that available in lightning arresters used at present. This purpose is achieved by developing an arc between a solid electrode and a surface of a body of electrolyte enclosed in an insulating container. Water vapor rising from the surface of the electrolyte mechanically interrupts the arc, which is mainly interrupted because of the increased air gap. Further distinctive features and advantages of this invention will become apparent from the study of this specification in conjunction with the accompanying drawing.

Figure 1:
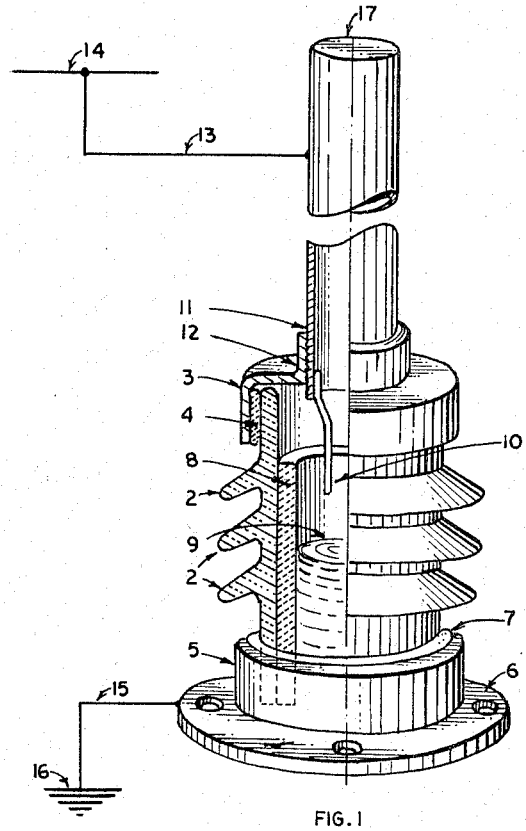
Figure 2:
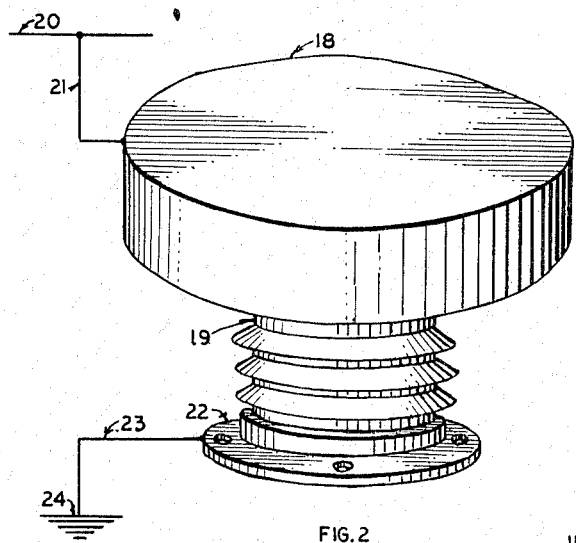

FIG. 1 of this drawing presents a perspective elevational view, and partly a vertical section of an embodiment of this invention. FIG. 2 of the same drawing shows a perspective view of the same lightning arrester, provided with a vapor condenser, serving at the same time as a rainshield.

In detailed consideration of FIG. 1 it can be seen that the porcelain tube 1 provided with the skirts 2, is hermetically closed by means of cap 3, which is fastened to tube 1 by means of the cement layer 4. The bottom cap 5, is provided with flange 6, and is also fastened to porcelain tube 1, by means of a layer of cement 7. Inside porcelain tube 1, can be seen another tube 8, made of heat resistent, ceramic material serving for protection of the porcelain tube 1, against the influence of the arc. Tube 8 is partially filled with the electrolyte 9. Above the surface of the electrolyte 9 is suspended the pointed electrode 10, which is welded to tube 11. Tube 11, serving as a vapor condenser and as a conductor of the lightning and the follow up current, is fastened by means of a thread to hub 12, which is an integral part of cap 3. In FIG. 1 it is shown diagrammatically that tube 11 is connected by means of lead wire 13 to phase conductor 14, of the line to be protected against lightning. Also diagrammatically indicated is the connection of flange 6, through intermediary of wire 15, to ground 16.

In FIG. 2 is shown a perspective view of a lightning arrester of the same type as in FIG. 1, except that tube 11, made of copper or aluminum, and closed at its end 17, is replaced by a cylindrical metallic container, which is connected to porcelain tube 19 in the manner shown in FIG. 1. Also container 18, made of copper or aluminum is connected to the phase conductor 20 of the protected line, by means of lead wire 21. Similarly, the metallic flange 22, is connected by means of wire 23, to ground 24. Container 18, porcelain tube 19 and the cape 22 enclose a space hermetically separated from the outside atmosphere.

In operation of this lightning arrester, at an overvoltage condition on the phase conductor of the protected line, and arc discharge between the pointed electrode and the surface of the conductive liquid below it takes place. In consequence of this discharge a part of the conductive liquid is evaporated, and the ascending vapor interrupts mechanically the arc between the solid and the liquid electrode. The arc is also interrupted becauses it is cooled by the loss of heat necessary for evaporation of the liquid, consisting in a solution of acid, alkali, or salt in water. Also ionization of the water vapor absorbs some heat. But above all, the arc is interrupted because of the increased gap between the metallic electrode and the surface of the liquid, due to vapor formation. Still, an additional reason for interruption of the arc is the increased resistance of the electrolyte due to its increased concentration, which is a consequence of evaporation of water. Besides, the increased pressure of the water vapor makes more difficult the existence of an arc. In order not overly to increase the pressure of the water vapor, it is comprised in the large volume of the closed tube, which serve also for connection of the lightning arrester to the phase conductor of the line. The internal surface of this tube, or of the replacing it metallic container, need not to be galvanized if the tube or the container is made of copper or aluminum. The metallic container, which serves as a condenser of the water vapor, has also the additional function of shielding the petticoats of the insulating tube against rain. For freeze protection of the electrolyte in winter, alcohol, salt, or customary antifreeze chemicals used in automobiles, can be added to it. For protection of the container of water vapor, or of the corresponding to it tube, against overpressure, they can be provided either with safety valves or with overpressure diaphragms. In the majority of cases these devices are not necessary. After condensation of the vapor, be it in the tube or in the container provided for this purpose, the water drips back into the insulating housing of the lightning arrester, which is then ready for a repeat preformance.

A slight modification of this mode of operation can be achieved by arranging the metallic pointed electrode so that it sticks into the body of electrolyte. In this case a static overcharge on the conductor can be easily drained off to ground. The corresponding current would then cause an evaporation of the layer of the electrolyte of a thickness equal to the depth of immersion of the pointed electrode into the liquid. After this layer will have been evaporated, an arc will be developed between the metallic point and the surface of the electrolyte, as previously described.

In application of this lightning arrester a number of modifications can be made. For example, the tube serving as a water vapor condenser and for connection of the lightning arrester with the phase conductor can be bent into a helical or zig-zag shape. If the tube is shaped in form of the letter V, or in form of an inverted letter V, the discharge can take place between surfaces of liquids. In any case, the level of the electrolyte can be indicated with a water gauge glass, attached to the lower metallic cap of the lightning arrester. For quicker increase of the longitude of the gap, the radius of the column of electrolyte can be small. For high voltage and extra high voltage, several porcelain tubes provided with petticoats can be mounted one on top of the other, though only one arc gap can pass through all of them. A point electrode is not unconditionally necessary; the upper metallic cap itself can serve as an electrode. Also a pointed electrode of carbon electrode, such as used in arc lamps, can be applied. If the lightning arrester tube is made of transparent glass, the inside of it can be easily inspected. A lightning arrester as described in this specification, can be used, in addition to its function for overvoltage protection, also as a support of a disconnect switch of a bus support. Many more modifications and variations of this invention can be made, all in the spirit and within the scope of the following claim.

I claim:
1. A lightning arrester with vaporizable liquid electrode consisting of a hermetically closed insulating container, provided with petticoats on its exterior surface and partly filled with electrolyte, whose bottom level is connected to ground, whereas a metallic electrode is sus- pended above the top level of said electrolyte, and is connected to the phase conductor through the intermediary of a hermetic drum, mounted above said insulating container, said metallic drum being of such diameter as to extend beyond the petticoats of said insulating container, so that said drum constitutes a rainshield protecting said petticoats from direct exposure to rain, said metallic drum serving also for condensation of the electrolyte, which is evaporated as a consequence of the arc developed between the upper level of the electrolyte and said metallic electrode suspended over it, when an overvoltage prevails on said phase conductor, thus said vapor cannot escape from said insulating container and said metallic drum, but after its condensation serves repeatedly for the consecutive discharges of the lighting arrester.

References Cited

UNITED STATES PATENTS

| | | |
|---|---|---|
| 1,394,971 | 10/1921 | Creighton. |
| 1,479,276 | 1/1924 | Bennett _____ 317—63 |
| 1,651,872 | 12/1927 | Creighton _____ 317—63 |
| 2,858,468 | 10/1958 | Hedlund _____ 313—232 |
| 3,259,781 | 7/1966 | Person _____ 313—243 X |

FOREIGN PATENTS 146,279  12/1920  Great Britain.

DAVID J. GALVIN, *Primary Examiner.*

STANLEY D. SCHLOSSER, *Examiner.*

S. A. SCHNEEBERGER, *Assistant Examiner.*